Dec. 16, 1952  F. J. WALLACE  2,621,651
INSTRUMENT FOR DILATING AND EXAMINING THE ESOPHAGUS
Filed June 2, 1949  2 SHEETS—SHEET 1
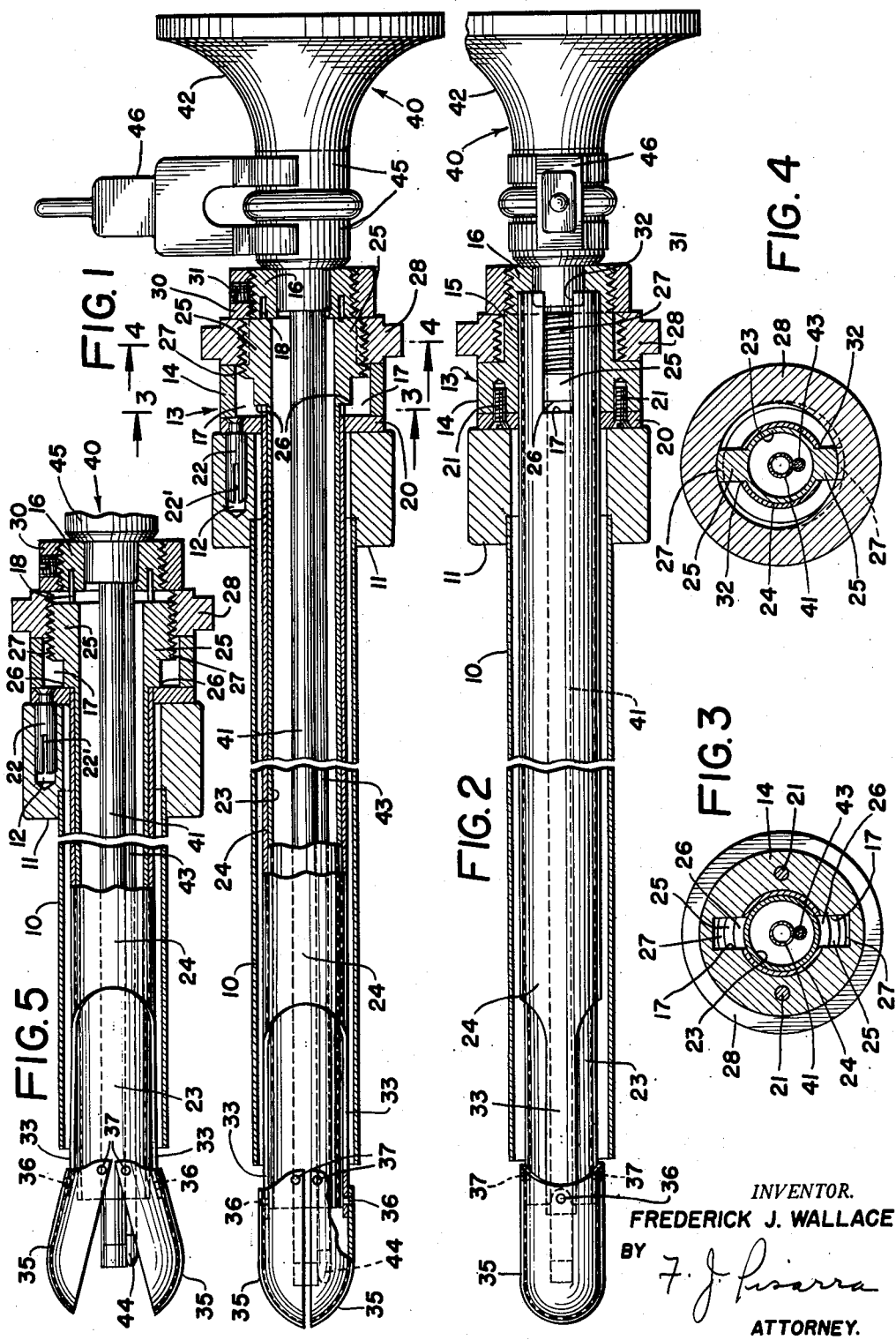
INVENTOR.
FREDERICK J. WALLACE
BY
F. J. Pisarra
ATTORNEY.

Dec. 16, 1952   F. J. WALLACE   2,621,651
INSTRUMENT FOR DILATING AND EXAMINING THE ESOPHAGUS
Filed June 2, 1949   2 SHEETS—SHEET 2
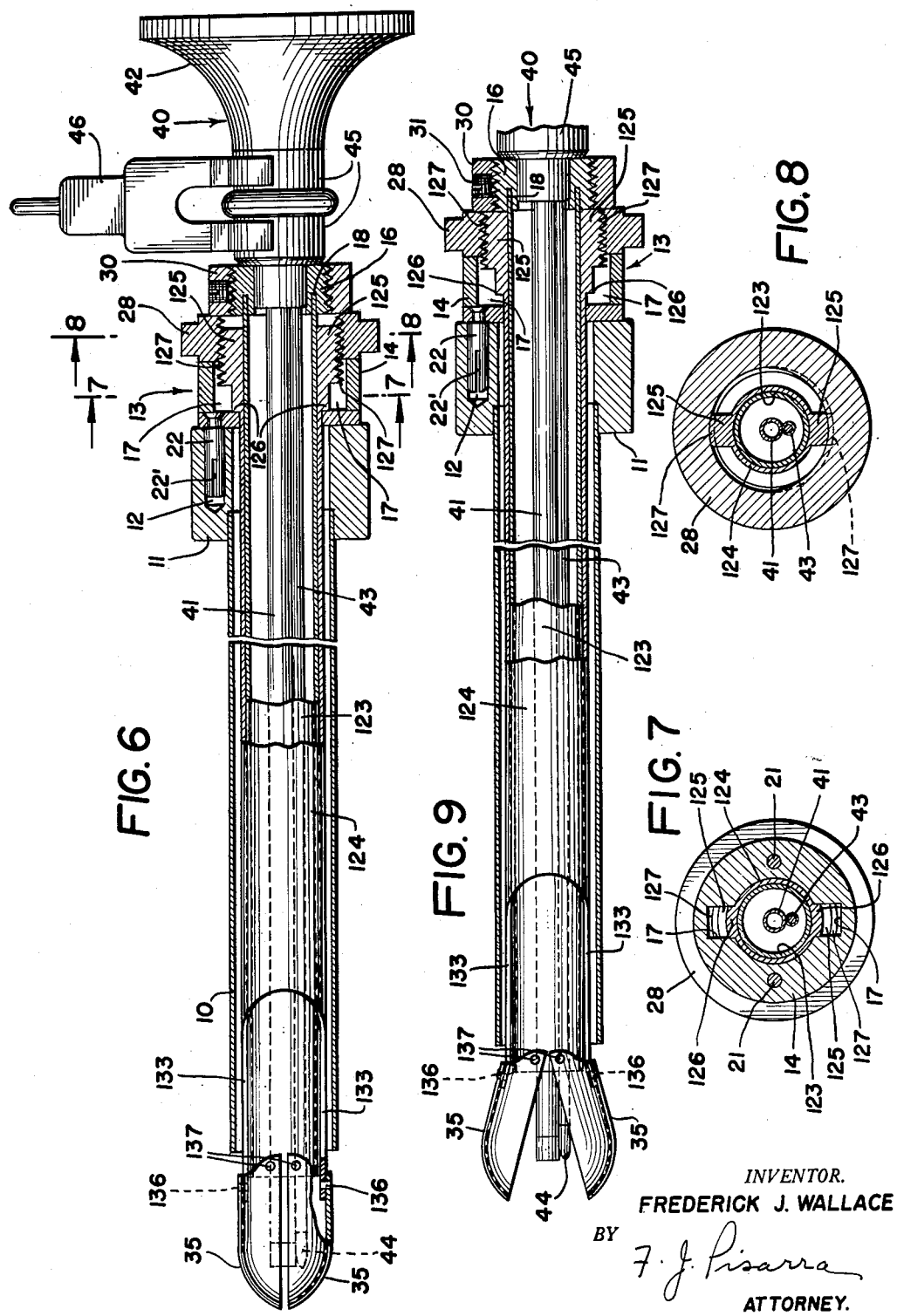
INVENTOR.
FREDERICK J. WALLACE
BY
*F. J. Pisarra*
ATTORNEY.

Patented Dec. 16, 1952

2,621,651

UNITED STATES PATENT OFFICE 2,621,651

INSTRUMENT FOR DILATING AND EXAMINING THE ESOPHAGUS

Frederick J. Wallace, New York, N. Y., assignor to American Cystoscope Makers, Inc., New York, N. Y., a corporation of New York Application June 2, 1949, Serial No. 96,638

2 Claims. (Cl. 128—4)

This invention relates to an examining instrument, and more particularly to an instrument that may be introduced into and removed from body passages for the purpose of permitting ready examination of the walls of such passages under conditions of illuminated vision.

An instrument constructed in accordance with this invention may be advantageously employed for examination and diagnosis of the esophagus. It will be apparent to persons versed in the art that the instrument is adapted to be readily used for purposes of examination and diagnosis in connection with other body passages as well.

It has been determined that in the examination of a body passage, such as the esophagus, with the usual examining instrument, the esophagus tends to become contracted in the region of the distal end of the instrument and to close off the opening in the instrument through which examination takes place. As a result, only relatively small areas of the esophagus are presented for examination at any one time.

The outstanding feature of this invention resides in the provision of dilator means capable of dilating or distending the esophagus in the region of the forward end of a surgical telescope, thereby permitting and facilitating examination of greater areas than have been heretofore possible. The dilator means preferably includes a pair of dished or scoop-shaped members disposed adjacent the forward end of the telescope. The dilator means also includes actuating means under the control of the individual using the instrument for imparting pivotal movement to the scoop-shaped members, whereby the members may be spread apart so as to dilate the esophagus adjacent to and forward of the telescope. The dilator means is so constructed and arranged as to permit of ready dilation of the esophagus or other passage without in any way interfering with the use of a telescope.

It is the primary object of this invention to provide an examining instrument that may be readily introduced into a body passage, such as the esophagus, and dilate selected portions of the passage.

Another object of the invention is to provide an instrument of the character indicated with a dilator incorporated therein to permit of ready examination of portions of body passages under conditions of illuminated vision.

Another object of the invention is to provide an instrument for examining body passages, such as the esophagus, which instrument includes a dilator for distending the passage in the region of the forward end of a surgical telescope, whereby relatively large areas of the inner surface of the passage may be examined.

A further object of the invention is to provide an examining instrument of the type indicated which is simple and compact in design, sturdy in construction, and capable of performing its intended functions in an efficient, trouble-free manner.

With the above and other objects in view, the invention comprises the devices, combinations and arrangements of parts set forth in the following detailed description and illustrated in the annexed drawings of preferred embodiments of the invention, from which the several features of the invention, together with the advantages attainable thereby, will be readily understood by persons skilled in the art.

In the drawings:

Figure 1 is a view in side elevation, partly in central vertical cross-section, of one recommended form of instrument constructed in accordance with the invention, parts being broken away for better illustration;

Figure 2 is a view similar to Figure 1 and illustrates the instrument rotated through 90° about its longitudinal axis;

Figure 3 is a cross-sectional view taken along line 3—3 of Figure 1;

Figure 4 is a cross-sectional view taken along line 4—4 of Figure 1;

Figure 5 is a fragmentary view corresponding to Figure 1 and illustrates another relative position of certain parts;

Figure 6 corresponds to Figure 1 and illustrates another arrangement of apparatus embodying the invention;

Figure 7 is a cross-sectional view taken along line 7—7 of Figure 6;

Figure 8 is a cross-sectional view taken along line 8—8 of Figure 6; and

Figure 9 is a fragmentary view corresponding to Figure 6 and illustrates another relative position of certain parts.

Referring now to the drawings wherein like reference numerals denote corresponding parts throughout the several views, and more particularly to the embodiment of the invention shown in Figures 1 through 5, the examining instrument of this invention preferably comprises a tubular sheath 10 open at its forward end and having its rearward end press-fitted or otherwise secured to a collar 11 that is provided with a blind bore 12 which is parallel to its longitudinal axis. A tubular support member 13 (Figures 1 and 2) comprises a forward portion 14 and intermediate and rearward portions 15 and 16, respectively, of reduced outer diameter. Portions 14 and 15 are preferably formed on a common inner diameter which is greater than the inner diameter of rearward portion 16. Further, portions 14 and 15 are provided with a pair of diametrically opposed slots 17 (Figures 1 and 3), while rearward portion 16 is provided with a concentric annular groove 18.

A ring 20 bears against the front face of tubular member 13 and is secured thereto by a pair of screws 21 (Figures 2 and 3). Affixed to and projecting forwardly of ring 20 is a pin 22, slotted at its free end, as indicated at 22'. Pin 22 is adapted to register with blind bore 12 and serves to frictionally engage collar 11 and maintain ring 20 and member 13 in proper alignment with the collar and the tubular sheath.

Within sheath 10 is a pair of concentric tubes, namely, an inner tube 23 and an outer tube 24. The inner tube carries a pair of diametrically opposed wings or lateral extensions 25, each of which is adapted to register with and move along a corresponding slot 17 in support member 13. Each wing is provided with a forward annular shoulder 26 and is threaded, as indicated at 27, to engage with internal threads formed in an actuating ring 28. A collar 30 threadedly engages rearward portion 16 of the support member and is maintained in the illustrated position by a set screw 31. Actuating ring 28, while rotatable with respect to support member 13 about the common axis of tubes 23 and 24, is restrained against axial movement by virtue of being positioned between the rearward face of portion 14 and the front face of collar 30.

Outer tube 24 is slotted, as indicated at 32, to accommodate wings 25 (Figure 2). The rear end of the outer tube is press-fitted or otherwise anchored in annular groove 18. The forward end of the outer tube is cut away to obtain a pair of diametrically arranged, parallel flexible arms 33.

The apparatus of this invention preferably includes a pair of dished or scoop-shaped dilator members 35. Each dilator member is connected to the free end of a corresponding flexible arm 33 by a rivet 36 and is pivotally connected to inner tube 23 by a pair of coaxial pins 37. The common axis of the pins of each dilator member is parallel to the corresponding axis of the pins of the other dilator and is normal to the longitudinal axis of the inner and outer tubes.

A surgical telescope, generally indicated by numeral 40, includes a tubular stem 41 that houses an appropriate lens system (not shown) and a conventional eyepiece 42. Secured to stem 41 and parallel therewith is a lamp tube 43 that carries a miniature electric lamp 44 at its forward end. Intermediate stem 41 and eyepiece 42 is a pair of terminal rings 45. A terminal member 46 is connected to the terminal rings and is adapted to be connected to a suitable source of electric current supply for energizing lamp 44.

For the purpose of briefly outlining the mode of operation of the above-described embodiment of the invention, it is first assumed that the instrument has been assembled and inserted in a body passage, such as the esophagus, to the desired location, and that the parts of the instrument are in the relative position shown in Figure 1. To dilate the esophagus, the operator manually rotates actuating ring 28 in one direction, thereby imparting forward movement of wings 25 and inner tube 23 with respect to tubular support member 13 and outer tube 24. This causes dilator members 35 to be spread apart or pivoted about the axes of corresponding pins 37, the upper dilator member being pivoted in a clockwise direction and the lower dilator member being pivoted in a counter-clockwise direction, as viewed in Figure 1, until shoulder 26 abuts the rear face of ring 20, at which time the dilator members are in maximum open or dilating position (Figure 5). This effects distention or dilation of the esophagus and the operator may then examine the same by means of telescope 40, illumination being supplied by electric lamp 44.

To close the dilators, that is, to return them from the position shown in Figure 5 to that shown in Figure 1, the operator merely rotates actuating ring 28 in a reverse direction, thereby moving wings 25 and inner tube 23 rearwardly until the wings bear against rearward portion 16 of tubular member 13.

Reference is next had to Figures 6 through 9 for an understanding of the construction of the second embodiment of the invention which is similar in many respects to the first described embodiment. The second embodiment of the invention contemplates arranging the parts so that the inner tube is fixed with respect to support member 13 and sheath 10, while the outer tube is movable axially with respect to the support member and the inner tube. The inner tube is designated by numeral 123 and is press-fitted in annular groove 18 in rearward portion 16 of support member 13. The outer tube 124 is concentric with the inner tube and is provided with diametrically opposed wings 125 that register with slots 17. Each wing 125 is formed with a shoulder 126 and is threaded, as indicated at 127. Each flexible arm 133 of the outer tube is secured to a corresponding dilator member 35 by a rivet 136. Each dilator member is pivoted to the inner tube by pins 137.

It will be apparent from an examination of Figure 6 that the operator, upon imparting rotation to actuating ring 28 in one direction, effects axial movement of outer tube 124 toward the right to thereby cause dilator members 35 to swing apart or pivot about pins 137 until the parts assume the relative position shown in Figure 9. To return the dilator members from the position shown in Figure 9 to that shown in Figure 6, the operator merely rotates actuating ring 28 in a reverse direction, thereby moving wings 125 and outer tube 124 toward the left, as viewed in Figure 9, until shoulder 126 bears against the rear face of ring 20 and the dilator members are closed, as shown in Figure 6.

From the foregoing, it is believed that the construction, operation, and advantages of my present invention will be readily comprehended by persons skilled in the art. It is to be clearly understood, however, that the forms of my invention herewith shown and described are to be taken as preferred examples of the same and that various changes in the shape, size and arrangement of parts may be resorted to without departing from the spirit of my invention as defined by the appended claims.

I claim:

1. In an instrument for dilating a body passage, such as the esophagus, a support, an outer tube secured to the support, a pair of diametrically opposed parallel flexible arms integral with and extending forwardly of the tube, an inner tube positioned within the outer tube, a pair of dilator members, each dilator member being rigidly attached to the free end of a corresponding arm and pivotally connected to the inner tube, means carried by the support for imparting axial movement to the outer tube with respect to the inner tube, said arms coacting with the dilator members in response to such axial movement to pivot one dilator member in one direction and the other dilator member in the opposite direction with respect to the inner tube.

2. In an instrument for dilating a body passage, such as the esophagus, a support, an outer tube secured to the support, a pair of diametrically opposed parallel flexible arms integral with and extending forwardly of the tube, an inner tube positioned within the outer tube, a pair of dilator members, each dilator member being rigidly attached to the free end of a corresponding arm and pivotally connected to the inner tube, a rotary actuating member carried by the support, means mounted on the support permitting rotary movement of the actuating member but preventing axial movement thereof relative to the support, means translating rotary movement of the actuating member into axial movement of the outer tube with respect to the inner tube, said arms coacting with the dilator members in response to such axial movement to pivot one dilator member in one direction and the other dilator member in the opposite direction with respect to the inner tube.

FREDERICK J. WALLACE.

REFERENCES CITED

The following references are of record in the file of this patent:

UNITED STATES PATENTS

| Number | Name | Date |
| --- | --- | --- |
| 1,003,232 | Cerbo | Sept. 12, 1911 |
| 1,139,015 | Cerbo | May 11, 1915 |
| 1,303,135 | Wappler | May 6, 1919 |
| 1,950,788 | Ewerhardt | Mar. 13, 1934 |